(12) United States Patent
Yim (10) Patent No.: US 8,310,411 B2
(45) Date of Patent: Nov. 13, 2012

(54) PLASMA DISPLAY AND DRIVING METHOD THEREOF

(75) Inventor: Sang-Hoon Yim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 523 days.

(21) Appl. No.: 12/626,574

(22) Filed: Nov. 25, 2009

(65) Prior Publication Data

US 2010/0134387 A1   Jun. 3, 2010

(30) Foreign Application Priority Data

Dec. 1, 2008 (KR) .................. 10-2008-0120663

(51) Int. Cl.
*G09G 3/28* (2006.01)
(52) U.S. Cl. ..................... 345/60; 345/173; 345/175
(58) Field of Classification Search .................. None
See application file for complete search history.

(56) References Cited

U.S. PATENT DOCUMENTS

| | | | |
|---|---|---|---|
| 6,091,030 A | 7/2000 | Tagawa et al. | |
| 2006/0103637 A1* | 5/2006 | Yamaguchi et al. | 345/175 |
| 2006/0209047 A1* | 9/2006 | Jeong | 345/173 |
| 2008/0238822 A1* | 10/2008 | Lee | 345/60 |
| 2010/0026645 A1* | 2/2010 | Yim et al. | 345/173 |

FOREIGN PATENT DOCUMENTS

| | | |
|---|---|---|
| JP | 08-115057 | 7/1996 |
| JP | 10-143323 A | 5/1998 |
| JP | 2000-020237 | 1/2000 |
| JP | 2000 137564 | 5/2000 |
| JP | 2000 148347 | 5/2000 |
| JP | 2000-200148 | 7/2000 |
| JP | 2001-142641 | 5/2001 |
| JP | 2001-318765 | 11/2001 |
| JP | 2003 263145 | 9/2003 |

(Continued)

OTHER PUBLICATIONS

KIPO Notice of Allowance dated Dec. 23, 2010, for Korean priority Patent application10-2008-0120663, noting listed references in this IDS, as well as JP 08-115057, previously filed in an IDS dated Nov. 25, 2009.

(Continued)

*Primary Examiner* — Jason Olson
(74) *Attorney, Agent, or Firm* — Christie, Parker & Hale, LLP (57) ABSTRACT

A plasma display includes a plurality of discharge cells, and is driven with one frame divided into a plurality of subfields having respective weight values. Light emitting cells are selected through address discharge during an address period of each subfield, and sustain discharge is performed on the light emitting cells for a number of times corresponding to a weight value of the corresponding subfield during a sustain period of each subfield to display images. The plasma display provides a sensing period for identifying an external contact with the plasma display prior to the address period in at least one subfield of the plurality of subfields, and discharges the plurality of discharge cells during a sensing period. The plasma display identifies the external contact based on light generated from the discharge cells during the sensing period.

15 Claims, 9 Drawing Sheets

FOREIGN PATENT DOCUMENTS

| | | |
|---|---|---|
| KR | 1998-041328 | 8/1998 |
| KR | 1999-026080 | 4/1999 |
| KR | 10-0303319 | 11/2001 |
| KR | 1020040080270 A | 9/2004 |
| KR | 100626063 B1 | 9/2006 |
| KR | 1020070082958 A | 8/2007 |

OTHER PUBLICATIONS

Patent Abstracts of Japan and English machine translation of Japanese Publication 2001-318765 listed above, 13 pages, 2001.
Korean Patent Abstracts, Publication No. 1020010004389, dated Jan. 15, 2001, corresponding to Korean Patent 10-0303319 listed above.

\* cited by examiner

PLASMA DISPLAY AND DRIVING METHOD THEREOF

CROSS-REFERENCE TO RELATED APPLICATION

This application claims priority to and the benefit of Korean Patent Application No. 10-2008-0120663 filed in the Korean Intellectual Property Office on Dec. 1, 2008, the entire content of which is incorporated herein by reference.

BACKGROUND OF THE INVENTION

1. Field of the Invention

The present invention relates to a plasma display and a driving method thereof, and more particularly, to a plasma display having a touch panel function using infrared rays and a driving method thereof.

2. Description of the Related Art

A plasma display device is a display device including a plasma display panel (PDP) that displays characters or images by using plasma generated by a gas discharge.

The plasma display device is driven by dividing a single frame into a plurality of subfields having respective luminance weight values. During a reset period of each subfield, cells are initialized through reset discharges. During an address period of each subfield, light emitting cells and non-light emitting cells are selected through address discharge. Subsequently, during a sustain period, sustain discharge is performed in the light emitting cells for a number of times corresponding to a weight value of a corresponding subfield so as to display images.

For the above-described plasma display device, a touch panel is used as an input device capable of inputting through direct contact by a hand or a pen. At this point, a method using infrared rays may be used in order to implement a touch panel.

As such, in order to implement a touch panel using infrared rays, an infrared source for emitting infrared rays and an infrared sensor for detecting infrared rays have to be additionally mounted on the plasma display device.

Additionally, in order to implement a stable touch panel, a proper amount of infrared rays should be emitted uniformly. Here, in order to emit a uniform, proper amount of infrared rays, multiple infrared sources may be disposed on the plasma display device, or one infrared source may be disposed far away from an object. However, both of these two methods increase the volume of the plasma display device.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a plasma display for uniformly emitting a proper amount of infrared rays without increasing the volume of the plasma display and a driving method thereof.

In an exemplary embodiment of the present invention, there is provided a method for driving a plasma display including a plurality of discharge cells and being driven with one frame divided into a plurality of subfields respectively having weight values. The driving method includes: discharging the plurality of discharge cells during a first period of a sensing period in at least one subfield of the plurality of subfields; initializing the plurality of discharge cells during a second period subsequent to the first period of the sensing period; selecting light emitting cells among the plurality of discharge cells through address discharge during an address period subsequent to the sensing period; performing sustain discharge in the light emitting cells for a number of times corresponding to a weight value of a corresponding one of the subfields during a sustain period subsequent to the address period; and identifying a contact with the plasma display based on light generated from the discharge cells during the sensing period.

In another exemplary embodiment of the present invention, there is provided a plasma display. The plasma display includes a plasma display panel, a controlling board, and a driving board. The plasma display panel includes a plurality of discharge cells. The controlling board drives the plasma display panel with one frame divided into a plurality of subfields having respective weight values, provides a sensing period prior to an address period in at least one subfield including the address period and a sustain period among the plurality of subfields, and identifies a contact with the plasma display based on light generated from the discharge cells during the sensing period. The driving board discharges the plurality of discharge cells during a first period of the sensing period, initializes the plurality of discharge cells during a second period, subsequent to the first period, of the sensing period, selects light emitting cells among the plurality of discharge cells through address discharge during the address period, and performs sustain discharge in the light emitting cells for a number of times corresponding to a weight value of the at least one subfield.

In still another exemplary embodiment of the present invention, there is provided a method for driving a plasma display with one frame divided into a plurality of subfields respectively having weight values, the plasma display including a plurality of discharge cells defined by a plurality of first electrodes and a plurality of second electrodes extending in one direction and a plurality of third electrodes extending in a direction crossing the plurality of first electrodes and the plurality of second electrodes. The driving method includes: applying a scan pulse and an address pulse to the plurality of first electrodes and the plurality of second electrodes, respectively, during a first period of a sensing period; initializing the plurality of discharge cells during a second period subsequent to the first period of the sensing period; sequentially applying the scan pulse to the plurality of first electrodes during an address period; selectively applying the address pulse to the plurality of address electrodes while the scan pulse is being applied to the plurality of first electrodes during the address period; alternately applying a sustain pulse to the plurality of first electrodes and the plurality of second electrodes for a number of times corresponding to a weight value of a corresponding one of the subfields; and identifying a contact with the plasma display based on light generated from the discharge cells during the sensing period.

In the exemplary embodiments of the present invention, the functions of a stable touch panel can be implemented because every discharge cell of a display area can uniformly emit a proper amount of infrared rays.

DETAILED DESCRIPTION OF EXEMPLARY EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising," will be understood to imply the inclusion of stated elements but not the exclusion of any other elements.

A wall charge being described in accordance with the present invention means a charge formed on a wall (e.g., a dielectric layer) close to each electrode of a cell. The wall charge will be described as being "formed" or "accumulated" on the electrode even though the wall charges do not actually touch the electrodes. Further, a wall voltage means a potential difference formed on the wall of the discharge cell by the wall charge. A weak discharge is weaker than an address discharge in an address period and a sustain discharge in a sustain period.

Hereinafter, a plasma display and a driving method thereof according to exemplary embodiments of the present invention will be described with reference to the accompanying drawings.

Figure 1:
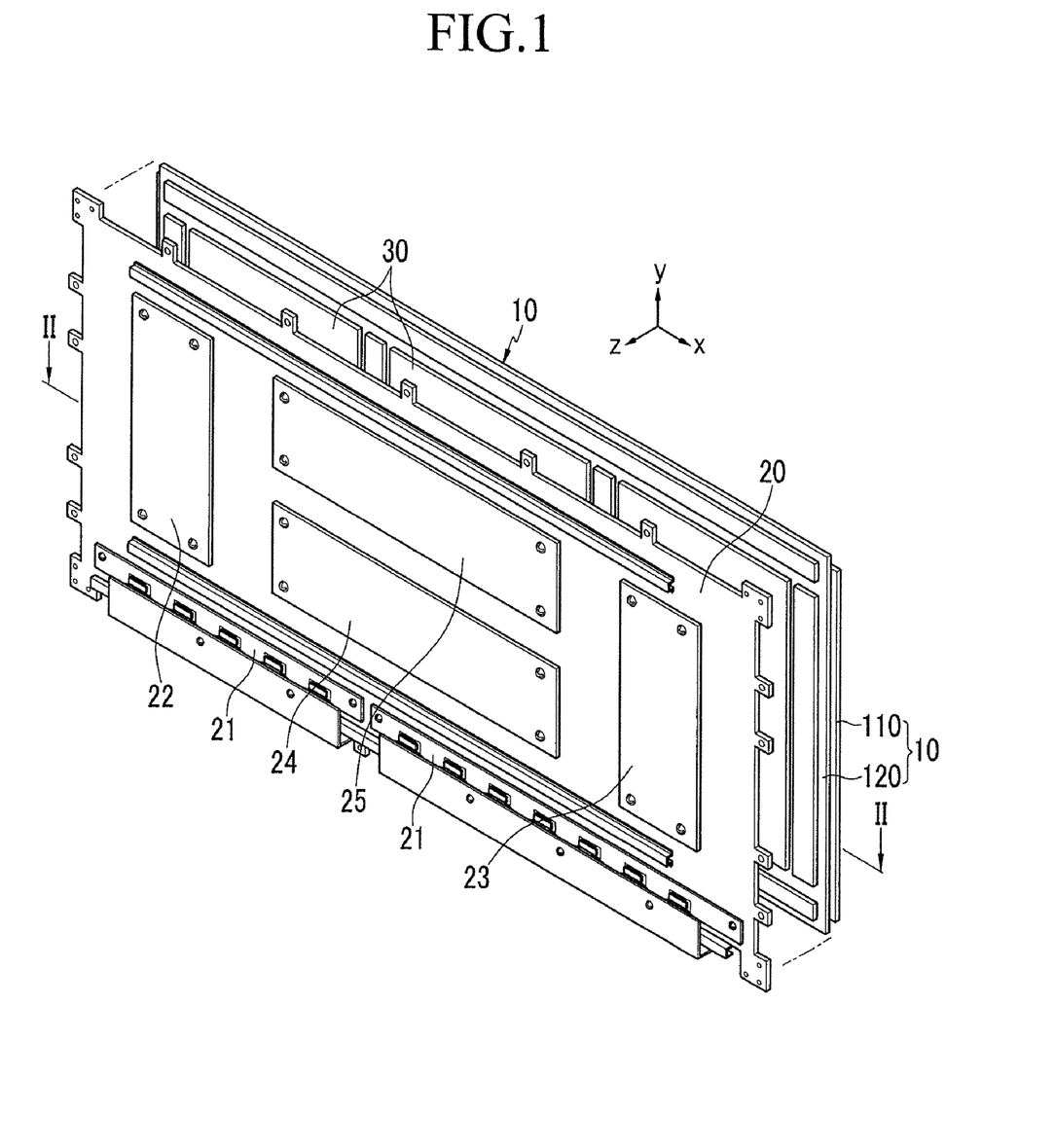
FIG. 1 is a schematic drawing illustrating an exploded perspective view of a plasma display according to a first exemplary embodiment of the present invention.
Figure 2:
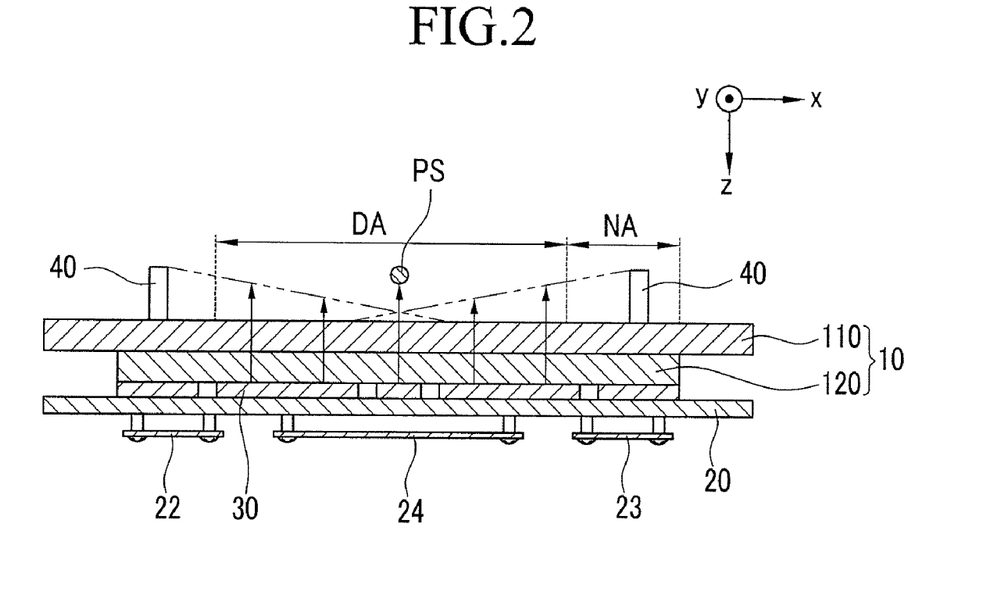
FIG. 2 is a schematic drawing illustrating a cross sectional view of the plasma display taken along the line II-II of FIG. 1.
Figure 3:
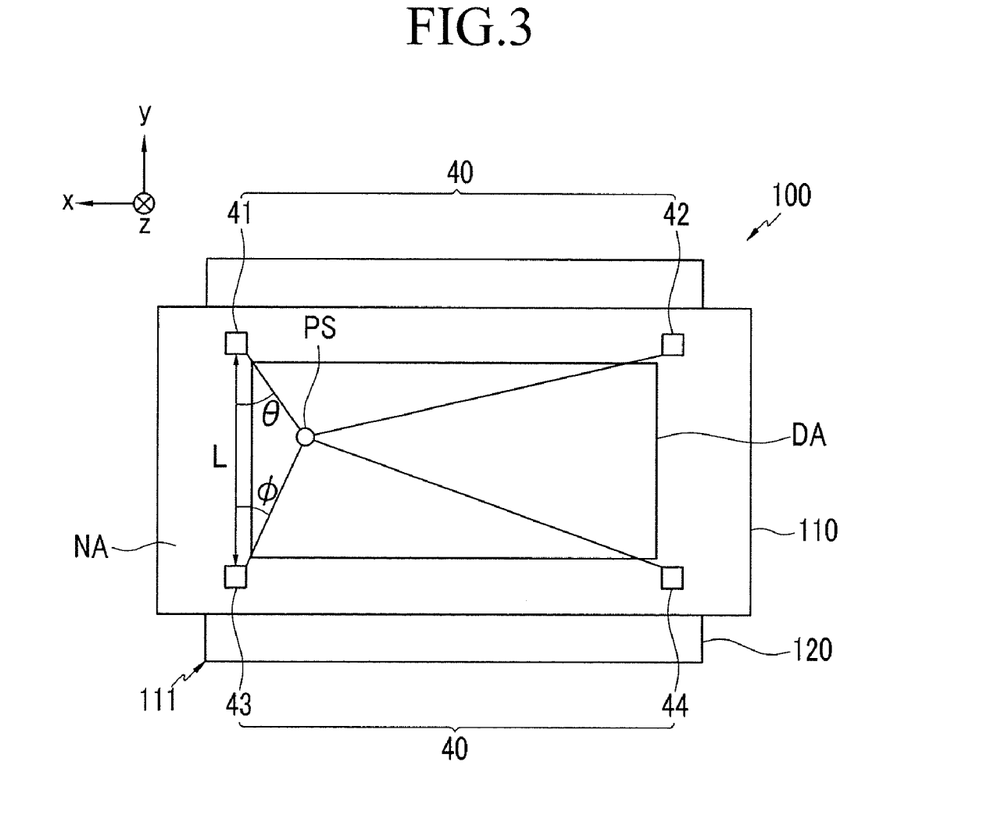
FIG. 3 is a schematic drawing illustrating a front view of a plasma display panel as shown in FIG. 1.
Figure 4:
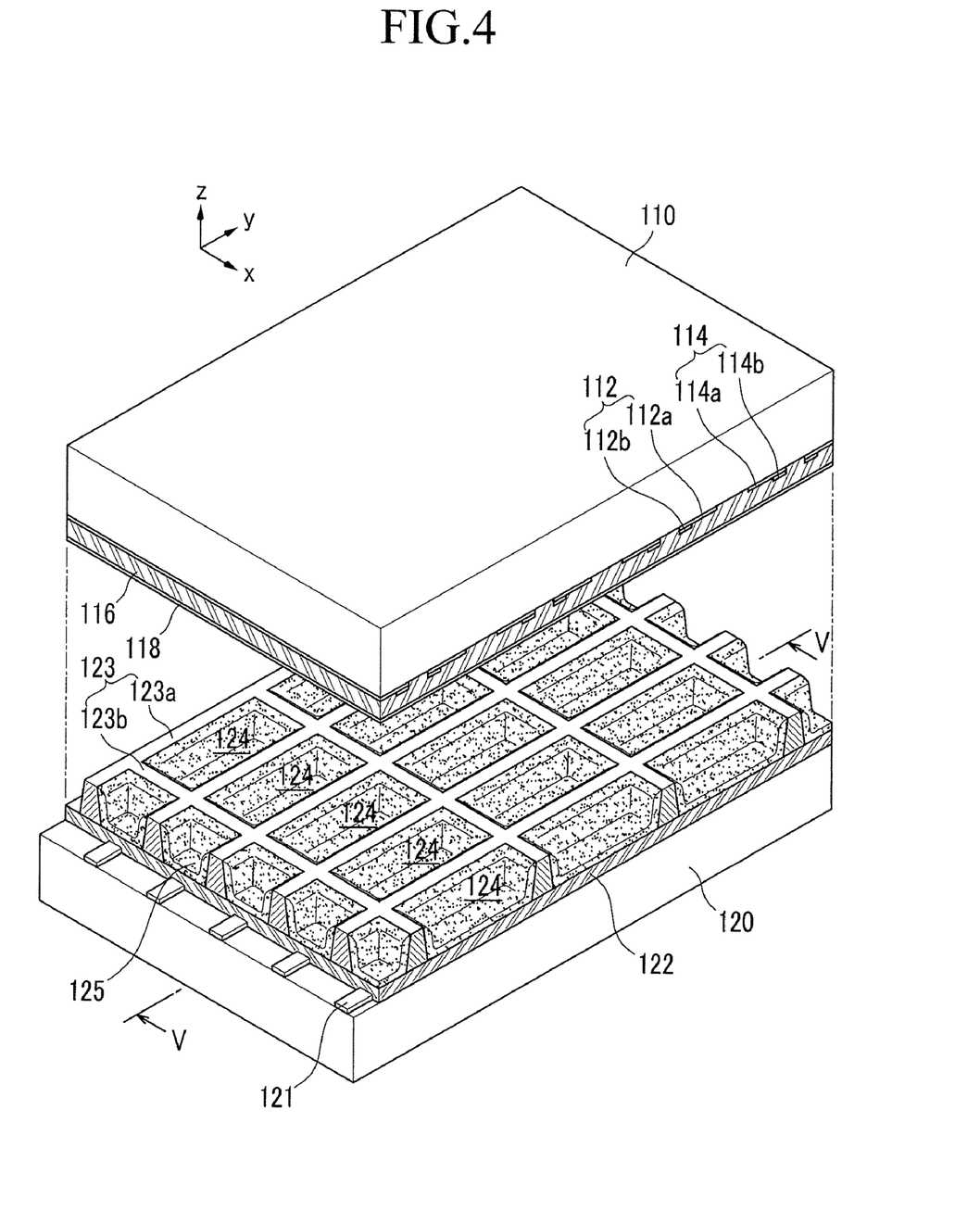
FIG. 4 is a schematic drawing illustrating a partial exploded perspective view of the plasma display panel as shown in FIG. 1.
Figure 5:
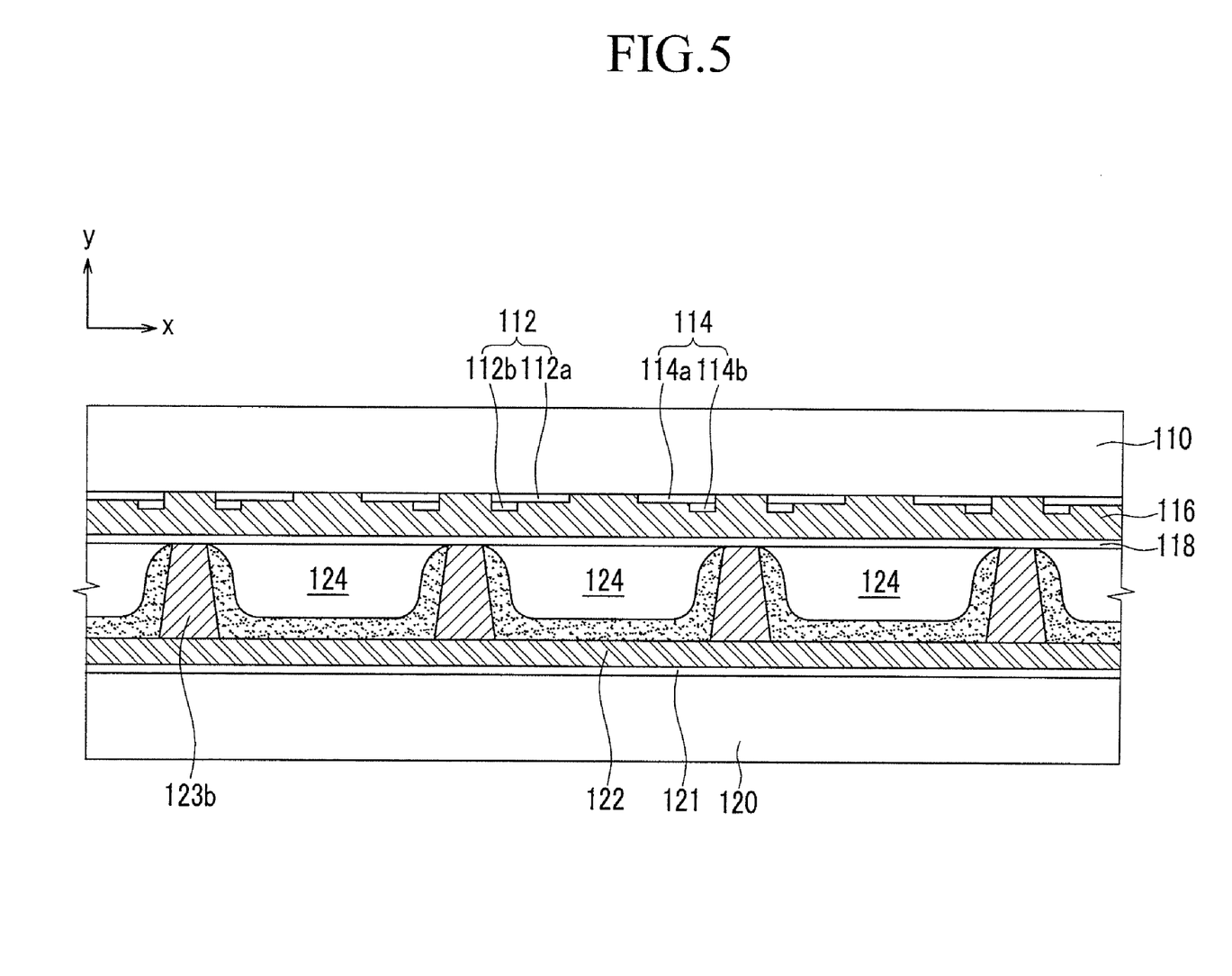
FIG. 5 is a schematic drawing illustrating a cross sectional view of the plasma display panel taken along the line V-V of FIG. 4.

FIG. 1 is a schematic drawing illustrating an exploded perspective view of a plasma display according to a first exemplary embodiment of the present invention. FIG. 2 is a schematic drawing illustrating a cross sectional view of the plasma display taken along the line II-II of FIG. 1. FIG. 3 is a schematic drawing illustrating a front view of a plasma display panel as shown in FIG. 1. FIG. 4 is a schematic drawing illustrating a partial exploded perspective view of the plasma display panel as shown in FIG. 1. FIG. 5 is a schematic drawing illustrating a cross sectional view taken along the line V-V of FIG. 4.

As shown in FIGS. 1 and 2, the plasma display according to the first exemplary embodiment of the present invention includes a plasma display panel 10, a chassis base 20, a heat dissipation sheet 30, and an infrared sensor 40.

The plasma display panel 10 is joined with the chassis base 20 that is disposed on the opposite side of the surface of the plasma display panel 10 where an image is displayed to thus form the plasma display. The heat dissipation sheet 30 is placed between the plasma display panel 10 and the chassis base 20.

The plasma display panel 10 includes a front substrate 110 having a given size and a rear substrate 120 arranged at a predetermined distance from and substantially in parallel with the front substrate 110.

According to the first exemplary embodiment of the present invention, the infrared sensor 40 is attached onto the image display surface of the front substrate 110. As shown in FIG. 3, the infrared sensor 40 includes four infrared sensors 41 to 44 disposed on the front substrate 110, and the four infrared sensors 41 to 44 may be disposed in a non-display area NA of the front substrate 110, corresponding to respective square corners of a display area DA of the front substrate 110. These infrared sensors 41 to 44 detect an amount of infrared rays emitted from the display area DA.

Referring again to FIG. 1, boards 21 to 25 provided for driving the plasma display panel 10 are formed on the chassis base 20.

The address driving board 21, formed in either upper or lower portions of the chassis base 20, may be provided as a single board or a plurality of boards. FIG. 1 exemplarily illustrates a plasma display driven by a single driving method in which the address driving board 21 is disposed at the lower portions of the chassis base 20 according to one embodiment of the present invention. In the case of a plasma display driven by a dual driving method, the address driving board 21 is disposed at the upper and lower portions of the chassis base 20. The address driving board 21 receives an address driving control signal from the controlling board 24 and supplies it to a plurality of address electrodes (hereinafter, referred to as "A electrodes").

The scan driving board 22 is disposed at the left side of the chassis base 20, and supplies a driving voltage to a plurality of scan electrodes (hereinafter, referred to as "Y electrodes") in response to a driving control signal from the controlling board 24.

The sustain driving board 23 is disposed at the right side of the chassis base 20, and supplies a driving voltage to a plurality of sustain electrodes (hereinafter, referred to as "X electrodes") in response to a driving control signal from the controlling board 24. Alternatively, unlike in FIG. 1, the scan driving board 22 may be disposed at the right side of the chassis base 20, and the sustain driving board 23 may be disposed at the left side of the chassis base 20.

The controlling board 24 receives an external video signal corresponding to one frame, generates driving control signals of the plurality of A electrodes, the plurality of Y electrodes, and the plurality of X electrodes, and supplies them respectively to the address driving board 21, the scan driving board 22, and the sustain driving board 23. At this point, the controlling board 24 drives by dividing one frame into a plurality of subfields, and each of the subfields includes an address period and a sustain period. Each of the subfields may further include a reset period prior to the address period.

Additionally, the controlling board 24 provides a sensing period for identifying an external contact prior to the address period in at least one subfield of the plurality of subfields, and identifies the external contact based on light, i.e., infrared rays, generated during the sensing period. At least part of the sensing period may be used as the reset period.

When an object PS is placed in front of the display area DA, infrared rays that have been uniformly emitted undergo a change in the vicinity of the object PS. Accordingly, the controlling board 24 is able to detect whether an amount of infrared rays detected by the infrared sensor 40 exceeds a threshold value or whether there is a change in amount and identify an external contact position by using the results of detection. At this point, the controlling board 24 can identify a contact position, for example, by triangulation. According to triangulation, the linear distance L between the two infrared sensors (41 and 43 of FIG. 3), the angle θ of the infrared sensor (41 of FIG. 3) relative to a straight line between the two infrared sensors (41 and 43 of FIG. 3), and the angle φ of the infrared sensor (43 of FIG. 3) relative thereto can be measured, and their crossing point can be identified as a contact position.

The power supply board 25 supplies power for driving the plasma display. The controlling board 24 and the power supply board 25 may be disposed at a center portion of the chassis base 20.

Herein, the address driving board 21, the scan driving board 22, and the sustain driving board 23 form driving parts for driving the plurality of A electrodes, the plurality of Y electrodes, and the plurality of X electrodes. The control board 24 forms a control part for controlling each driving part, and the power supply board 25 forms a power supply part for supplying power to the driving parts and the control part.

Subsequently, referring to FIGS. 3 and 4, a plurality of discharge cells 124 are formed by partitioning a space between the front substrate 110 and the rear substrate 120 by barrier ribs 123. A display area DA is defined by the plurality of discharge cells 124.

A plurality of A electrodes 121 are formed side by side at predetermined intervals extending in a direction (y-axis direction of the drawing) on the rear substrate 120 at its surface facing the front substrate 110, and a dielectric layer 122 is formed on substantially the entire surface of the rear substrate 120 while covering the A electrodes 121.

The barrier ribs 123 defining the plurality of discharge cells 124 are formed over the dielectric layer 122. The barrier ribs 123 include barrier rib members 123a extending in a direction (y-axis direction of the drawing) parallel with the A electrodes 121 and barrier rib members 123b extending in a direction (x-axis direction of the drawing) crossing the barrier rib members 123a. The present invention should not be understood to be limited to the above described barrier rib structure. To the contrary, the present invention may be applied to various barrier rib structures such as a striped structure in which the barrier rib members are formed only in parallel with the A electrodes.

Phosphor layers 125 of red, green, and blue color for emitting visible light by absorbing vacuum ultraviolet rays are formed in the discharge cells 124, and discharge gas (for example, a mixed gas of Xe and Ne) is filled therein to cause a predetermined discharge. Hereupon, infrared rays are emitted upon the discharge.

A plurality of Y electrodes 112 and a plurality of X electrodes 114 are formed and extend in a direction (x-axis direction of the drawing) crossing the A electrodes 121 on a surface of the front substrate 110 facing the rear substrate 120. The Y electrodes 112 and the X electrodes 114 include bus electrodes 112b and 114b, respectively, longitudinally extending in a direction (x-axis direction of the drawing) crossing the A electrodes 121, and protrusion electrodes 112a and 114a, respectively, protruding toward the center of each discharge cell 124 from the bus electrodes 112b and 114b. For example, a pair of bus electrodes 112b and 114b may correspond to each discharge cell 124. The protrusion electrodes 112a and 114a are formed in pairs facing each other on each corresponding discharge cell 124.

The protrusion electrodes 112a and 114a function to generate plasma discharges in the discharge cells 124, and may be made of a transparent material, e.g., indium tin oxide (ITO), in order to provide a sufficient opening ratio. The bus electrodes 112b and 114b may be made of an opaque material with suitable electrical conductivity to account for the high resistance of the protrusion electrodes 112a and 114a.

A dielectric layer 116 is formed on the front substrate 110 while covering the Y electrodes 112 and the X electrodes 114. An MgO protective film 118 is formed on the front substrate 110 while covering the dielectric layer 116. The MgO protective layer 118 functions to protect the dielectric layer 116 from bombardment of ions generated upon plasma discharge and increase emission efficiency by having a high secondary electron emission coefficient.

The above-described structure of the plasma display panel 10 is an exemplary structure for a PDP, and panels of other structures, to which various driving waveforms to be described below can also be applied, can be used in accordance with the present invention.

Next, driving waveforms applied to the plurality of A electrodes 121, the plurality of Y electrodes 112, and the plurality of X electrodes 114 in a subfield having a sensing period will be described in detail with reference to FIGS. 6 and 7.

Figure 6:
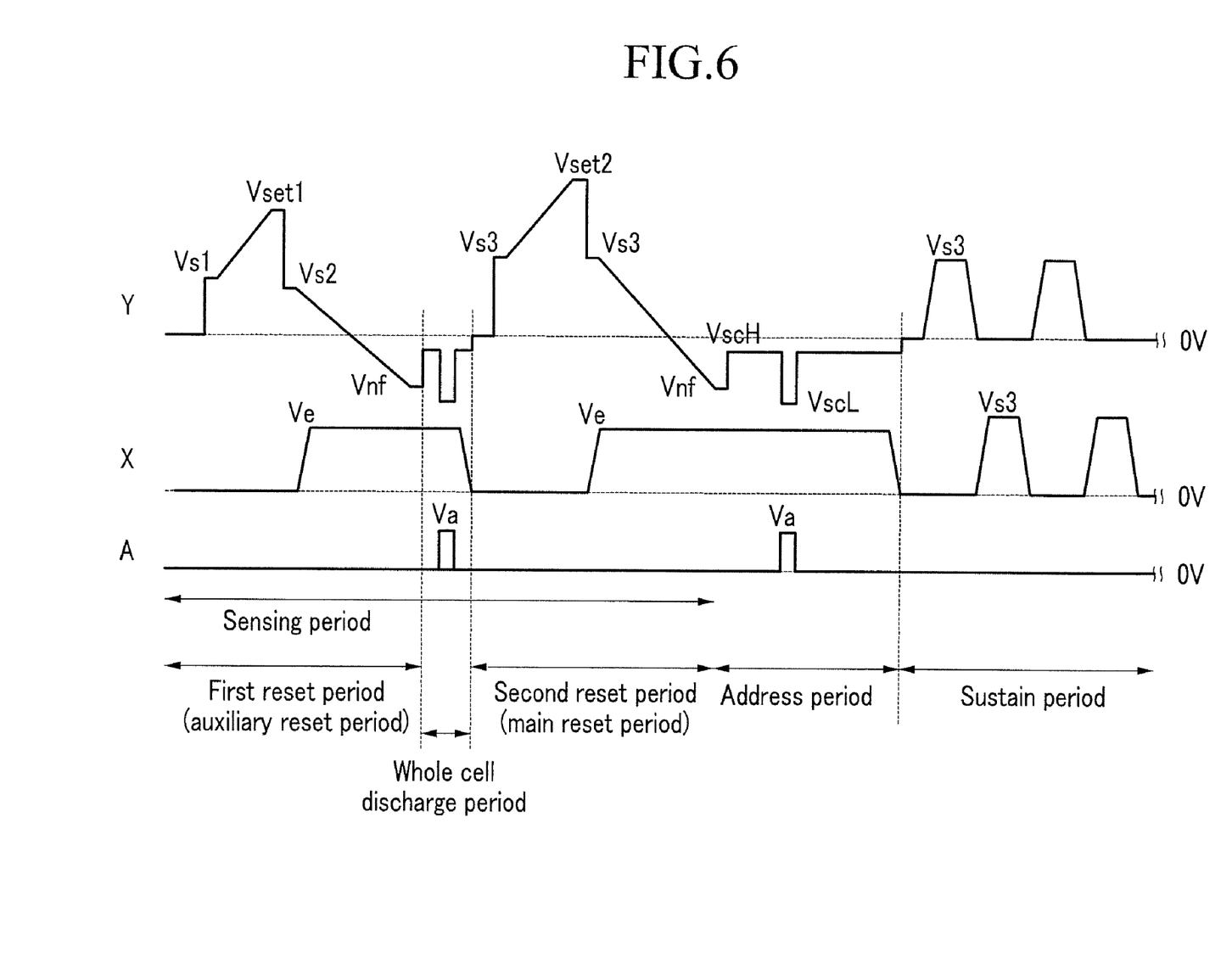
FIGS. 6 and 7 are driving waveform diagrams of the plasma display panel according to first and second exemplary embodiments of the present invention.
Figure 7:
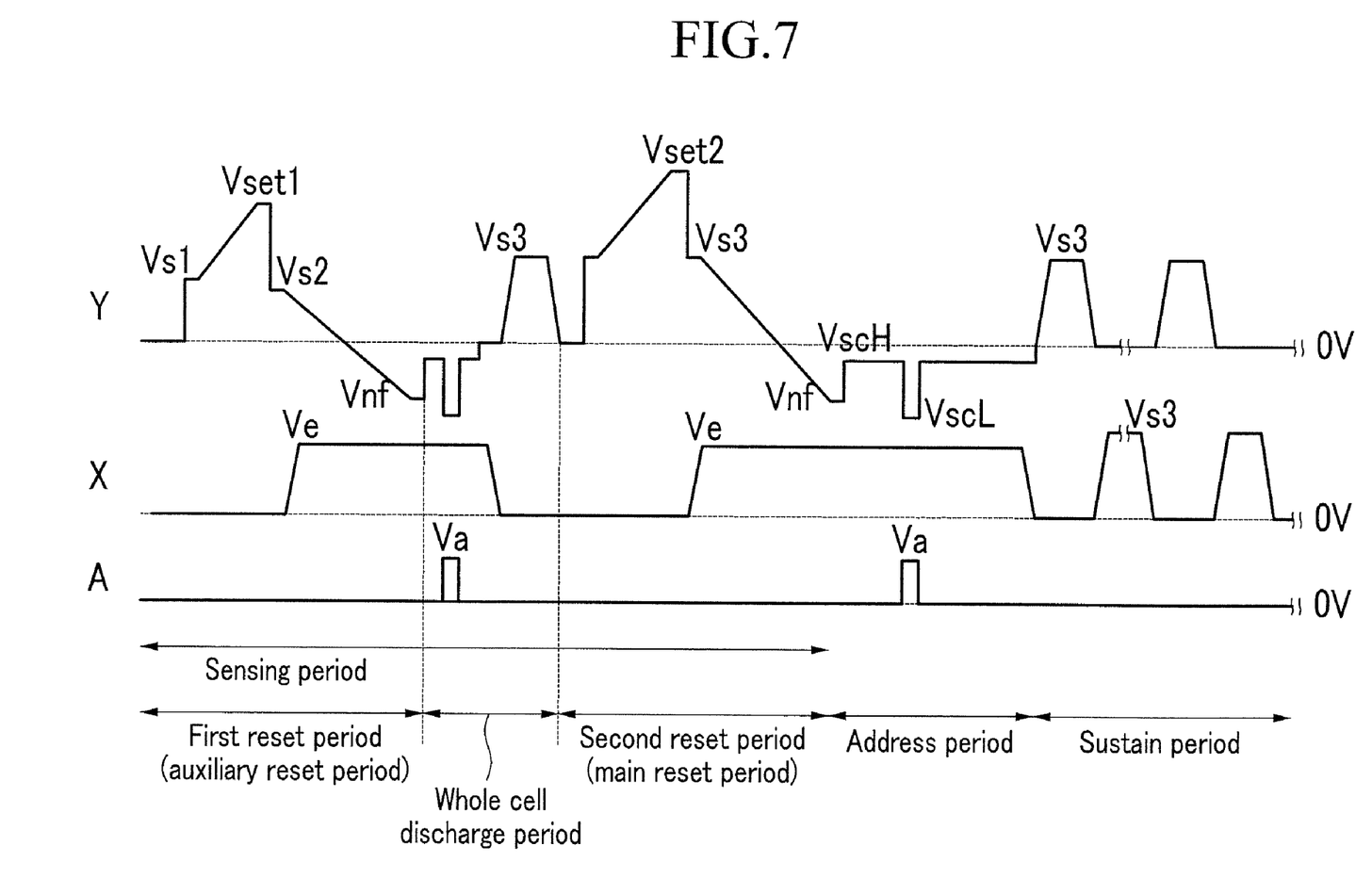

FIGS. 6 and 7 are driving waveform diagrams of the plasma display according to first and second exemplary embodiments of the present invention. In FIGS. 6 and 7, descriptions will be given with respect to a cell formed by one A electrode, one X electrode, and one Y electrode of the plurality of A electrodes 121, the plurality of Y electrodes 112, and the plurality of X electrodes 114.

First, as shown in FIG. 6, the sensing period includes a first reset period, a whole cell discharge period, and a second reset period. The sensing period may include a whole cell discharge period and a second reset period. Moreover, although FIG. 6 illustrates that the first reset period is an auxiliary reset period, and the second reset period is a main reset period, both of the first reset period and the second reset period may be either a main reset period or an auxiliary reset period, or the first reset period may be a main reset period and the second reset period may be an auxiliary reset period.

During a rising period of the first reset period, the address driving board 21 and the sustain driving board 23 respectively bias the A electrode and the X electrode to a reference voltage (0V in FIG. 6), and the scan driving board 22 gradually increases a voltage of the Y electrode from a voltage Vs1 to a voltage Vset1. In FIG. 6, the voltage of the Y electrode is shown to increase in a ramp pattern. If the sum of a wall voltage between the X electrode and the Y electrode and a voltage of the Y electrode is greater than the discharge firing voltage between the X electrode and the Y electrode, a feeble discharge (hereinafter, referred to as a "weak discharge") is induced between the Y electrode and the X electrode in a light emitting cell. If the sum of a wall voltage between the Y electrode and the A electrode and a voltage of the Y electrode is greater than the discharge firing voltage between the A electrode and the Y electrode while the voltage of the Y electrode is increasing, weak discharge is also induced between the Y electrode and the A electrode in the light emitting cell. As a result, negative (−) wall charges are formed at the Y electrode of the light emitting cell, and positive (+) wall charges are formed at the X and the A electrodes in the light emitting cell. Since the first reset period is the auxiliary reset period, the Vset1 voltage is set to a suitable voltage to prevent or reduce the occurrence of a reset discharge on a non-light emitting cell where sustain discharge was not induced in the previous subfield.

During a falling period of the first reset period, while the sustain driving board 23 and the address driving board 21 respectively apply a voltage Ve and a reference voltage to the X electrode and the A electrode, the scan driving board 22 gradually decreases the voltage of the Y electrode from a voltage Vs2 to a voltage Vnf. In FIG. 6, the voltage of the Y electrode is shown to decrease in a ramp pattern. However, because gradually decreasing the voltage at the Y electrode from the voltage Vs1 to the voltage Vnf would increase the time length of the reset period, the voltage at the Y electrode may decrease from the voltage of Vs2 which is lower than the voltage Vs1 at which no discharge starts. Then, a weak discharge is induced between the Y electrode and the X electrode of the light emitting cell and between the Y electrode and the A electrode of the light emitting cell while the voltage of the Y electrode is decreasing, and the negative (−) wall charges formed at the Y electrode of the light emitting cell and the positive (+) wall charges formed at the X and A electrodes of the light emitting cell are erased. In general, the Ve voltage and the Vnf voltage are set to suitable voltages to make the wall voltage between the Y electrode and the X electrode close to 0V for cells not to be selected at the address period to not induce sustain discharge at the sustain period. That is, the (Ve-Vnf) voltage is set to be about a discharge firing voltage between the Y electrode and the X electrode.

Subsequently, during the whole cell discharge period, while the sustain driving board 23 maintains the voltage of the X electrode at the voltage Ve, the scan driving board 22 and the address driving board 21 apply a scan pulse having a voltage VscL and an address pulse having a voltage Va, respectively, to the Y electrode and the A electrode. Concretely, the scan driving board 22 and the address driving board 21 concurrently apply a scan pulse and an address pulse to the plurality of Y electrodes and the plurality of A electrodes. Then, address discharge is induced in all discharge cells, and a constant amount of infrared rays may be uniformly emitted by the address discharge.

Next, during a rising period of the second reset period, the address driving board 21 and the sustain driving board 23 respectively bias the A electrode and the X electrode to a reference voltage (0V in FIG. 6), and the scan driving board 22 gradually increases a voltage of the Y electrode from a voltage Vs3 to a voltage Vset2. Accordingly, while the voltage of the Y electrode increases, as a weak discharge is generated between the Y electrode and the X electrode and between the Y electrode and the A electrode, a negative (−) wall charge is formed on the Y electrode, and a positive (+) wall charge is formed on the X and A electrodes. At this time, a voltage Vset3 is set to be higher than a discharge firing voltage between the X electrode and the Y electrode in order to induce discharge at all cells. However, as described above, since the reset discharge is induced only at light-emitting cells if the voltage of the Y electrode increases to the voltage Vset1, the voltage Vset2 may be set to be higher than the voltage Vset1.

Subsequently, during a falling period of the second reset period, the sustain driving board 23 biases the X electrode to the voltage Ve, and the scan driving board 22 gradually decreases the voltage of the Y electrode from the voltage Vs3 to a voltage Vnf. Accordingly, while the voltage of the Y electrode decreases, as a weak discharge is generated between the Y electrode and the X electrode and between the Y electrode and the A electrode, a negative (−) wall charge that is formed on the Y electrode and a positive (+) wall charge that is formed on the X electrode and the A electrode are erased. Moreover, a constant amount of infrared rays may be uniformly emitted by the weak discharge generated during the second reset period.

As such, according to the above-described exemplary embodiments of the present invention, a touch is detected based on infrared rays caused by the discharge generated during the sensing period, which is not associated with an image display operation, and hence, according to the embodiments of the present invention, a touch is detected by an operation independent from an image display operation, and an infrared source does not have to be additionally provided. Furthermore, it is possible to perform a stable touch detection function by uniformly emitting a sufficient amount of infrared rays during the sensing period.

Next, during the address period, the scan driving board 22 and the address driving board 21 respectively apply a scan pulse having the voltage VscL and an address pulse having the voltage Va to the Y electrode and the A electrode while the sustain driving board 23 maintains the voltage of the X electrode at the voltage Ve in order to select light emitting cells and non-light emitting cells in a corresponding subfield from among a plurality of discharge cells. The scan driving board 22 applies a voltage VscH that is higher than the voltage VscL to the Y electrode to which no scan pulse is applied, and the address driving board 21 applies a reference voltage to the A electrode to which no address pulse is applied.

That is, during an address period, the scan driving board 22 and the address driving board 21 apply a scan pulse to the Y electrode (Y1 of FIG. 1) in the first row, and, at the same time, apply address pulses to the A electrodes disposed in the light emitting cells in the first row. Then, a discharge is generated between the Y electrode in the first row and the A electrode having the address pulses applied thereto. Accordingly, (+) wall charges are formed on the Y electrode and (−) wall charges are formed on the A electrode and the X electrode. Subsequently, the scan driving board 22 and the address driving board 21 apply a scan pulse to the Y electrode (Y2 of FIG. 1) in the second row, and, at the same time, apply address pulses to the A electrodes disposed in the light emitting cells in the second row. Then, the address discharge is generated in the cells formed by the A electrodes having the address pulses applied thereto and the Y electrode in the second row (Y2), and, accordingly, wall charges are formed in those cells. In the same manner, the scan driving board 22 and the address driving board 21 sequentially apply scan pulses to the Y electrodes in other rows and address pulses to the A electrodes disposed in the light emitting cells, thereby forming wall charges.

During a sustain period, the scan driving board 22 applies a sustain pulse having a high level voltage (Vs3 in FIG. 6) and a low level voltage (0V in FIG. 6) to the Y electrode for a number of times corresponding to a weight value of the corresponding subfield. The sustain driving board 23 applies a sustain pulse to the X electrode with a phase opposite to the sustain pulse that is applied to the Y electrode. That is, when the voltage Vs3 is applied to the X electrode, a voltage 0V is applied to the Y electrode, and when the voltage 0V is applied to the Y electrode, the voltage Vs3 is applied to the X electrode.

Accordingly, a voltage difference between the Y electrode and the X electrode alternately has a voltage Vs and a voltage −Vs, and therefore the sustain discharge is repeatedly generated in the light emitting cell a predetermined number of times.

Then, light emitting cells and non-light emitting cells are selected through address discharge during an address period, and sustain discharge is performed for a light emitting cell during a sustain period in the other subfields similarly to the first subfield. At this time, in the other subfields, only the first reset period of the sensing period may be used as the reset period. Otherwise, the reset period may be omitted.

Further, as shown in FIG. 7, at least one sustain discharge may be additionally generated in order to emit a larger amount of infrared rays after the occurrence of the address discharge during the whole cell discharge period. FIG. 7 shows that one sustain discharge occurs. That is, the scan driving board 22 applies a high level voltage (Vs3 in FIG. 7) of a sustain pulse to the Y electrode while the sustain driving board 23 applies a low level voltage (0V in FIG. 7) of a sustain pulse to the X electrode. Thus, one additional sustain discharge occurs in all of the discharge cells, thereby emitting a larger amount of infrared rays. Therefore, when an object (PS of FIG. 2) is placed in front of a display area (DA of FIG. 2), a change in the amount of infrared rays in the vicinity of the object PS can be more easily sensed.

Next, PDPs having other structures, to which the driving waveforms according to the first and second exemplary embodiments of the present invention can be applied, will be described in detail with reference to FIGS. 8 to 11.

Figure 8:
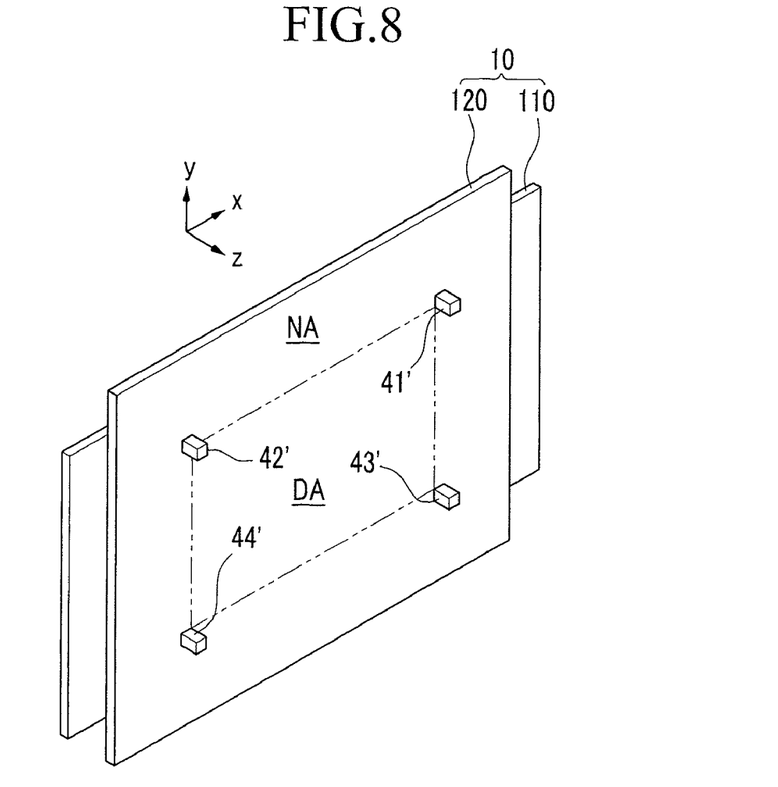
FIG. 8 is a schematic drawing illustrating a perspective view of a plasma display panel according to the second exemplary embodiment of the present invention.
Figure 9:
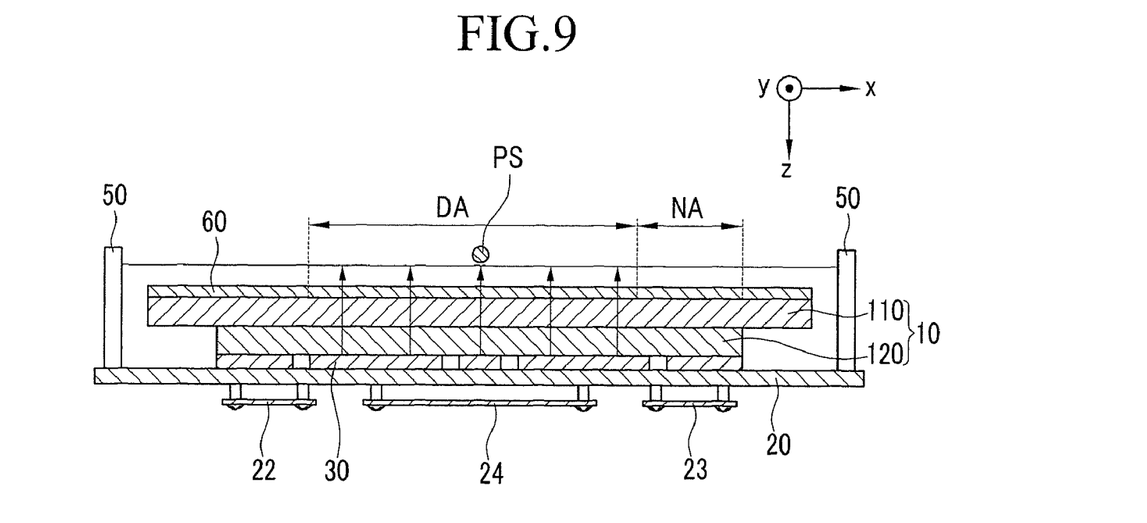
FIG. 9 is a schematic drawing illustrating a cross sectional view of a plasma display panel according to a third exemplary embodiment of the present invention.

FIG. 8 is a schematic drawing illustrating a perspective view of a plasma display panel according to the second exemplary embodiment of the present invention. FIG. 9 is a schematic drawing illustrating a cross sectional view of a plasma display panel according to a third exemplary embodiment of the present invention.

As shown in FIG. 8, unlike the first exemplary embodiment, an infrared sensor 40' including infrared sensors 41'-44' may be disposed on the opposite side of the surface where an image is displayed on the rear substrate 120. Infrared rays are reflected backward from an object PS placed in front of a display area DA and emitted onto the rear surface of the display area DA. At this point, since the amount of infrared rays changes at the reflected position, it is possible to detect a touch position of the object PS even if the infrared sensor 40' is positioned on the rear substrate 120. Hereupon, as the infrared sensor 40' is positioned on the rear substrate 120, the chassis base 20 may be formed in a different manner from that in the first exemplary embodiment.

The infrared sensors 40 and 40' may be replaced by other components, for example, infrared cameras.

Further, as shown in FIG. 9, the plasma display may include a detector 50 for detecting infrared rays, emitted to the front or back of the display area DA, from the sides of the chassis base 20. The detector 50 is disposed on a side of the chassis base 20. For example, an infrared sensor and/or an infrared camera may be used as the detector 50.

Furthermore, the plasma display may further include an infrared passing filter 60 disposed on top of the front substrate 110. The infrared passing filter 60 transmits infrared rays emitted to the display area DA at a wavelength band of 800-1000 nm, and shields other wavelength bands.

Figure 10:
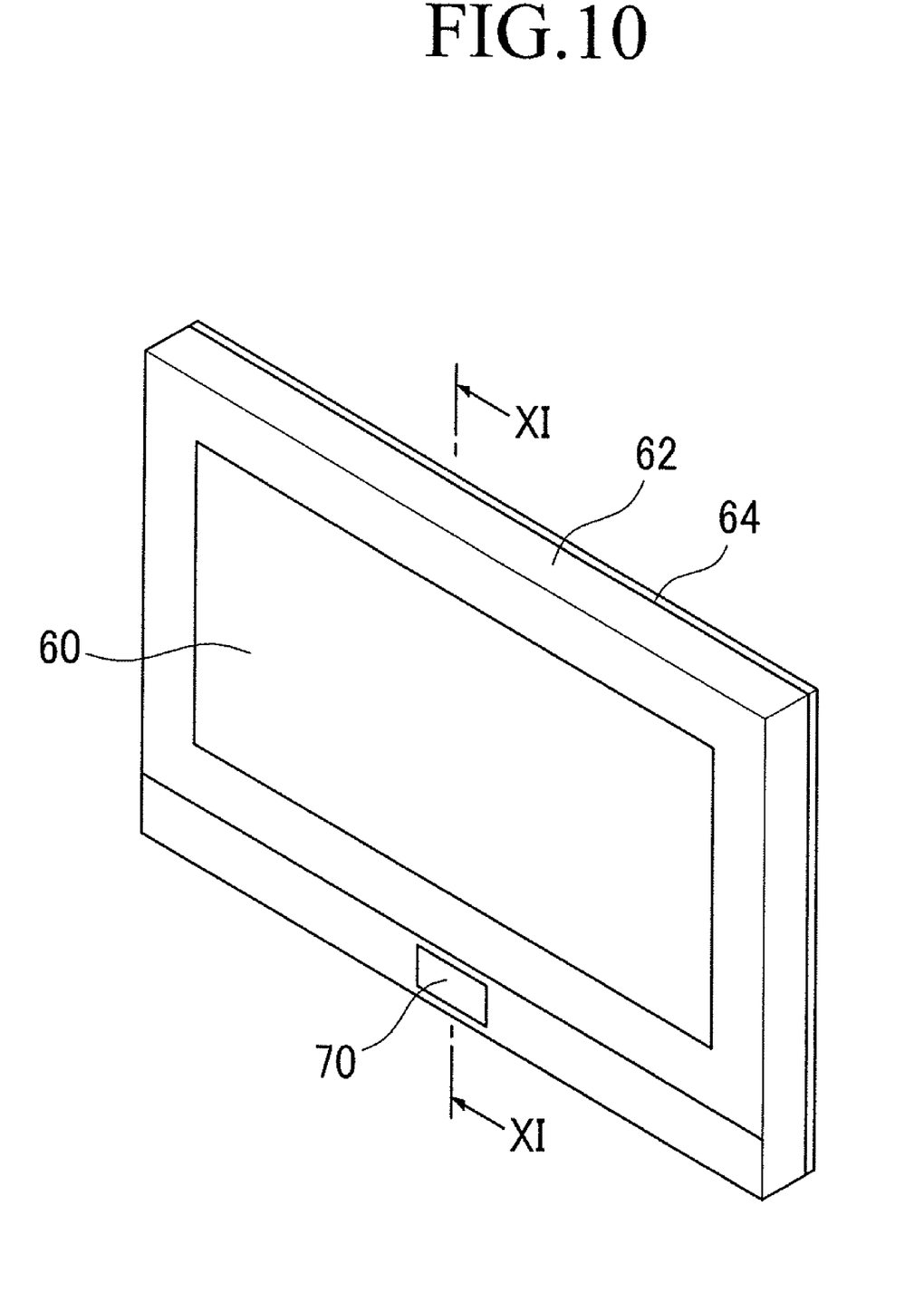
FIG. 10 is a schematic drawing illustrating a cross sectional view of a plasma display panel according to a fourth exemplary embodiment of the present invention.
Figure 11:
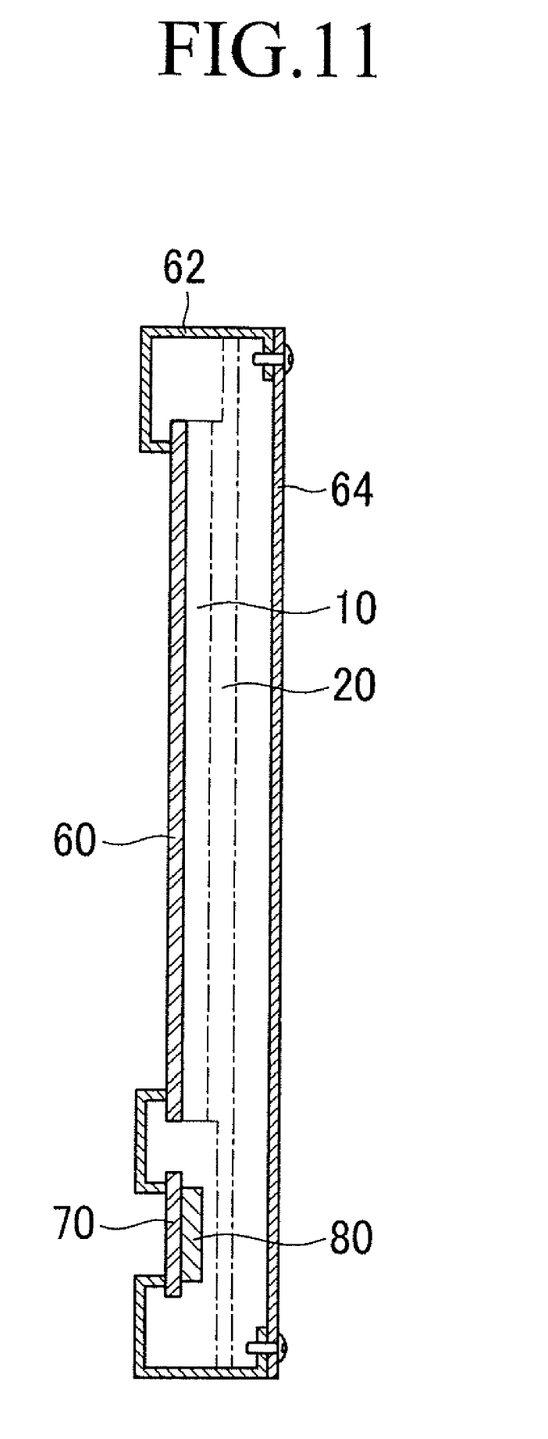
FIG. 11 is a schematic drawing illustrating a cross-sectional view of the plasma display panel of FIG. 10, taken along the line XI-XI.

As described above, in the case that the infrared passing filter 60 is provided, driving waveforms of the plasma display according to the exemplary embodiments of the present invention may be applied to the plasma display as shown in FIGS. 10 and 11.

FIG. 10 is a schematic drawing illustrating a perspective view of a plasma display according to a fourth exemplary embodiment of the present invention. FIG. 11 is a schematic drawing illustrating a cross sectional view taken along the line XI-XI of FIG. 10.

As shown in FIGS. 10 and 11, the plasma display may further include a light receiving sensor 70 and a light receiving sensor filter 80.

The light receiving sensor 70 transmits infrared rays irradiated from a remote control (not shown) at a wavelength band of 900-950 nm and shields other wavelength bands. At this point, the wavelength band of 900-950 nm irradiated to the light receiving sensor 70 from the remote control (not shown) overlaps with the wavelength band of 800-1000 nm that the infrared passing filter 60 transmits, thereby causing an error in the operation of the remote control.

The light receiving sensor filter 80 is installed in front of the light receiving sensor 70, and transmits infrared rays irradiated from the remote control (not shown) at a wavelength band of 900-950 nm and shields infrared rays at other wavelength bands. By doing so, it is possible to prevent an error in the operation of the remote control.

The light receiving sensor 70 and the light receiving sensor filter 80 may be formed in various structures at various positions. For instance, a front case 62 and a rear case 64 respectively encompassing the front surface of the plasma display panel 10 and the rear surface of the chassis base 20 are joined with the plasma display panel 10 and the chassis base 20 to thus form the plasma display. In one embodiment of the present invention, the light receiving sensor 70 may be installed inside the front case 62 away from the plasma display panel 10, and the light receiving sensor filter 80 may be installed at the front surface of the light receiving sensor 70 inside the front case 62.

While the present invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and equivalents thereof.

What is claimed is:

1. A driving method of a plasma display, the plasma display comprising a plurality of discharge cells and being driven with one frame divided into a plurality of subfields respectively having weight values, the driving method comprising:
    discharging the plurality of discharge cells during a first period of a sensing period in at least one subfield of the plurality of subfields;
    initializing the plurality of discharge cells during a second period subsequent to the first period of the sensing period;
    selecting light emitting cells among the plurality of discharge cells through address discharge during an address period subsequent to the sensing period;
    performing sustain discharge in the light emitting cells for a number of times corresponding to a weight value of a corresponding one of the subfields during a sustain period subsequent to the address period; and
    identifying a contact with the plasma display based on light generated from the discharge cells during the sensing period.

2. The method of claim 1, wherein the discharging of the plurality of discharge cells comprises performing address discharge in the plurality of discharge cells during the first period.

3. The method of claim 2, wherein the discharging of the plurality of discharge cells further comprises performing sustain discharge in the plurality of discharge cells at least once during a third period between the first period and the second period.

4. The method of claim 1, further comprising initializing at least one of the plurality of discharge cells during a fourth period, before the first period, of the sensing period.

5. The method of claim 1, wherein:
the plasma display comprises a plurality of first electrodes extending in one direction and a plurality of second electrodes extending in a direction crossing the plurality of first electrodes,
the plurality of discharge cells are defined by the plurality of first electrodes and the plurality of second electrodes,
the discharging of the plurality of discharge cells comprises:
applying a scan pulse to the plurality of first electrodes during the first period; and
applying an address pulse to the plurality of second electrodes during the first period, and
the selecting light emitting cells comprises:
sequentially applying the scan pulse to the plurality of first electrodes; and
selectively applying the address pulse to the plurality of second electrodes while the scan pulse is being applied to the plurality of first electrodes.

6. The method of claim 1, wherein:
the plasma display comprises a plurality of first electrodes and a plurality of second electrodes extending in one direction and a plurality of third electrodes extending in a direction crossing the plurality of first electrodes and the plurality of second electrodes,
the plurality of discharge cells are defined by the plurality of first electrodes, the plurality of second electrodes, and the plurality of third electrodes, and
the method further comprises:
applying a first voltage to the plurality of first electrodes during a third period between the first period and the second period and applying a second voltage, which is different from the first voltage, to the plurality of second electrodes, thereby discharging the plurality of discharge cells induced by a voltage difference between the first voltage and the second voltage.

7. A plasma display comprising:
a plasma display panel comprising a plurality of discharge cells;
a controlling board for driving the plasma display panel with one frame divided into a plurality of subfields having respective weight values, providing a sensing period prior to an address period in at least one subfield including the address period and a sustain period among the plurality of subfields, and identifying a contact with the plasma display based on light generated from the discharge cells during the sensing period; and
a driving board for discharging the plurality of discharge cells during a first period of the sensing period, initializing the plurality of discharge cells during a second period, subsequent to the first period, of the sensing period, selecting light emitting cells among the plurality of discharge cells through address discharge during the address period, and performing sustain discharge in the light emitting cells for a number of times corresponding to a weight value of the at least one subfield.

8. The plasma display of claim 7, wherein the driving board is configured to perform a sustain discharge in the plurality of discharge cells at least once during a third period, between the first period and the second period, of the sensing period.

9. The plasma display of claim 8, wherein:
the plasma display panel further comprises a first substrate having a plurality of address electrodes and a second substrate facing the first substrate, the second substrate having a plurality of scan electrodes and a plurality of sustain electrodes extending in a direction crossing the plurality of address electrodes,
the plurality of discharge cells are defined by barrier ribs between the first substrate and the second substrate,
the driving board is configured to apply a first voltage to the plurality of scan electrodes during the third period and apply a second voltage, different from the first voltage, to the plurality of sustain electrodes, and
the sustain discharge is induced by a voltage difference between the first voltage and the second voltage.

10. The plasma display of claim 7, wherein:
the plasma display panel further comprises a first substrate having a plurality of address electrodes and a second substrate facing the first substrate, the second substrate having a plurality of scan electrodes and a plurality of sustain electrodes extending in a direction crossing the plurality of address electrodes,
the plurality of discharge cells are defined by barrier ribs in a space between the first substrate and the second substrate, and
the driving board is configured to apply a scan pulse to the plurality of scan electrodes and an address pulse to the plurality of address electrodes during the first period, sequentially apply the scan pulse to the plurality of scan electrodes during the address period, and selectively apply the address pulse to the plurality of address electrodes while the scan pulse is applied to the plurality of scan electrodes.

11. The plasma display of claim 7, wherein the driving board is configured to initialize at least one of the plurality of discharge cells during a fourth period, before the first period, of the sensing period.

12. The plasma display of claim 11, further comprising a sensor electrically coupled to the controlling board for sensing light generated from the discharge cells during the sensing period.

13. A driving method of a plasma display, the plasma display being driven with one frame divided into a plurality of subfields respectively having weight values, the plasma display comprising a plurality of discharge cells defined by a plurality of first electrodes and a plurality of second electrodes extending in one direction and a plurality of third electrodes extending in a direction crossing the plurality of first electrodes and the plurality of second electrodes, the driving method comprising:
applying a scan pulse and an address pulse to the plurality of first electrodes and the plurality of third electrodes, respectively, during a first period of a sensing period;
initializing the plurality of discharge cells during a second period subsequent to the first period of the sensing period;
sequentially applying the scan pulse to the plurality of first electrodes during an address period;
selectively applying the address pulse to the plurality of third electrodes while the scan pulse is being applied to the plurality of first electrodes during the address period;
alternately applying a sustain pulse to the plurality of first electrodes and the plurality of second electrodes for a number of times corresponding to a weight value of a corresponding one of the subfields; and
identifying a contact with the plasma display based on light generated from the discharge cells during the sensing period.

14. The method of claim 13, further comprising applying a high level voltage to the plurality of first electrodes and a low level voltage to the plurality of second electrodes during a third period, between the first period and the second period, of the sensing period,
    wherein a discharge in the discharge cells is induced by a voltage difference between the high level voltage and the low level voltage.

15. The method of claim 13, further comprising initializing at least one of the plurality of discharge cells during a fourth period, right before the first period, of the sensing period.

* * * * *